(12) United States Patent
Kahl

(10) Patent No.: US 7,628,000 B2
(45) Date of Patent: Dec. 8, 2009

(54) LASER PROTECTION SCREEN

(76) Inventor: Helmut Kahl, Fossbrink 2, Porta Westfalica (DE)

( * ) Notice: Subject to any disclaimer, the term of this patent is extended or adjusted under 35 U.S.C. 154(b) by 720 days.

(21) Appl. No.: 10/501,541

(22) PCT Filed: Dec. 3, 2002

(86) PCT No.: PCT/EP02/13645

§ 371 (c)(1), (2), (4) Date: Jul. 16, 2004

(87) PCT Pub. No.: WO2004/048843

PCT Pub. Date: Jun. 10, 2004

(65) Prior Publication Data

US 2005/0120673 A1 Jun. 9, 2005

(30) Foreign Application Priority Data

Jan. 17, 2002 (DE) .................................. 202 00 664

(51) Int. Cl.
*E04B 2/00* (2006.01)

(52) U.S. Cl. .................... 52/588.1; 52/588; 52/578; 52/580; 52/579; 52/745.05; 52/747.1; 52/421; 52/429; 52/563

(58) Field of Classification Search ............ 52/578, 52/580, 581, 588.1, 650.3, 731.3, 732.2, 52/589.1, 579, 592.1, 831, 848, 745.05, 747.1, 52/421, 429, 563; 372/87; 256/65.01, 66, 256/24; 160/135, 137, 351

See application file for complete search history.

(56) References Cited

U.S. PATENT DOCUMENTS

| 3,301,147 | A | * | 1/1967 | Clayton et. al. | 404/35 |
| 3,385,182 | A | * | 5/1968 | Harvey | 404/35 |
| 3,562,992 | A | * | 2/1971 | Kinsey | 52/588.1 |
| 5,311,718 | A | * | 5/1994 | Trousilek | 52/425 |
| 5,491,943 | A | * | 2/1996 | Vondrejs et al. | 52/239 |
| 6,295,783 | B1 | * | 10/2001 | Davis | 52/736.3 |
| 6,412,250 | B2 | * | 7/2002 | Davis | 52/736.3 |
| 6,459,718 | B1 | * | 10/2002 | Kahl | 372/87 |

FOREIGN PATENT DOCUMENTS

| DE | 198 52 118 C | 2/2000 |
| DE | 198 55 793 | 6/2000 |
| DE | 202 00 664 | 7/2002 |
| WO | WO-95 20725 A | 8/1995 |

* cited by examiner

Primary Examiner—Jeanette Chapman

(57) ABSTRACT

A protective wall (1) for shielding against laser beams, in particular those stemming from welding machines, wherein the protective wall (1) contains light-alloy shaped sections (10-13) that are essentially rectangular and incorporates chambers that are formed by interior walls (2), and profilings that are formed on the front and/or side, wherein the light-alloy shaped sections (10-14) are lined up and connected side wall to side wall in an individually removable manner to form the protective wall (20, 22; 21, 23; 24, 25) in such a way that the profiling on the side is implemented step-like from a front wall (26) to a back wall (27).

22 Claims, 2 Drawing Sheets

LASER PROTECTION SCREEN

The invention is concerned with a protective wall for shielding against laser beams, in particular those stemming from welding machines, wherein the protective wall contains light-alloy shaped sections that are essentially rectangular and incorporates chambers that are formed by interior walls, and profilings that are formed on the front and/or side.

Laser protective walls of this type are known from DE 198 55 793.0. In these, the shaped sections are joined to create frames in each case, which are equipped in the grooves with fitted sheet metal plates. This type of construction has the shortcoming that the walls consist of large-surface framed plate elements, and assembly of every protective cabin therefore requires fitting the wall elements, and repair of a wall that has been damaged during rough workshop operations, or relocation or modification of a cabin built therefrom is very time consuming and generally entails wasted shaped section and plate material.

It is the object of the invention to create a simple protective wall system that considerably facilitates the setup, a modification, and a repair.

This object is met in such a way that the light-alloy shaped sections are lined up and connected side wall to side wall in an individually removable manner to form the protective wall in such a way that the profiling on the side is implemented step-like from a front wall to a back wall.

Advantageous embodiments are specified in the sub-claims.

The step-like profiling advantageously incorporates strip projections on one hand and matching grooves on the other hand, which are oriented toward the respective front or back of the wall.

The given hook-shaped strip projections that are spaced further apart preferably continue into the front wall, and strip projections that are spaced closer together extend either as a free side wall segment or hook-shaped adjacent to the side wall and end in each case recessed by approximately the wall thickness behind the front or back wall. In this manner a smooth front or back of the protective wall is obtained when the tongues are inserted and pushed into the grooves.

Advantageously there are shaped sections of different widths, as well as a corner element, the front and back wall of which are angled so that the side walls that serve to create the connection are located at a right angle to one another.

In addition to the hook-shaped strip connectors, the side walls additionally have preferably undercut grooves, in which wall plates, door hinges, etc., can be held like in the previously known protective wall system.

The front wall preferably has in its side regions undercut grooves in which connecting and/or finishing plates can be held frictionally or locked in place. The finishing plates preferably extend from one shaped section to the adjacent shaped section and thus create an additional connection. The outer face of the finishing plates is preferably shaped corrugated. The finishing plates are advantageously extruded from light alloy with their clamping hooks and front profiling.

The wall thickness is 80 mm, for example, and the spacing of the front grooves advantageously corresponds to half the wall thickness.

In the additional described examples, the shaped sections are placed vertically. However, they may also be lined up horizontally in such a way that they are held removably, e.g., screwed in, from one side in vertical connecting sections. In this arrangement, too, one or two shaped sections can be unscrewed, removed and replaced, since the connecting sections are provided only on the one side. The stepping of the side walls prevents a laser beam from penetrating through gaps caused by tolerances, which occur between the shaped sections, and additionally permits removal and replacement of individual shaped sections from one side.

Advantageous embodiments are presented in FIGS. 1 and 2.

Figure 1:
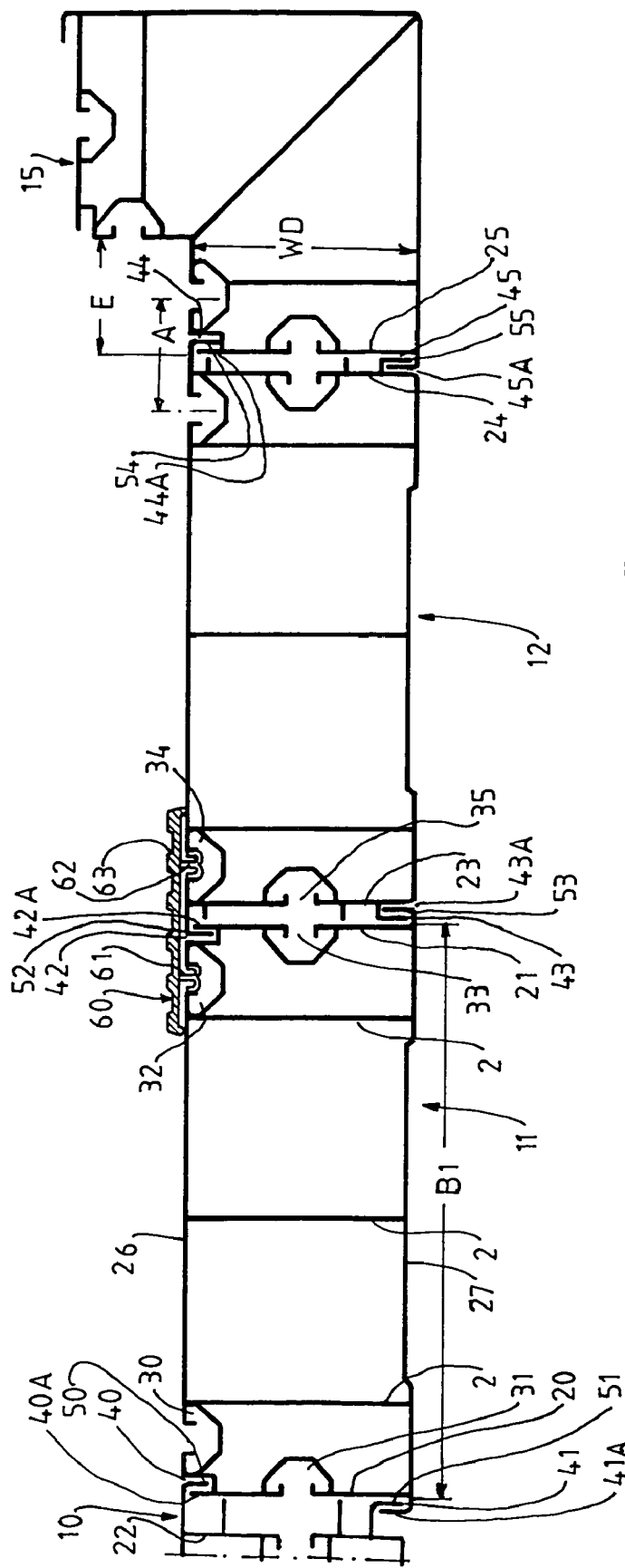
FIG. 1 shows a wall segment with a corner shaped section.

FIG. 1 shows a protective wall segment 1 of flat shaped sections 10, 11, and 12, and a corner shaped section 15, which are provided through intermediate walls 2 with hollow chambers. The side walls 20-25 of the shaped sections 10-12, 15 each incorporate near the front wall 26 and back wall 27 of the shaped section interlocking tongue and groove connections, which are formed by free-standing or hook-shaped strip projections 41A-43A; 50-53 with an adjoining groove 40-45 in each case. On adjoining shaped sections 10, 11, 12, the tongues are oriented alternating with the grooves in each case toward the respective front or back of the wall so that the shaped sections can alternately be removed and replaced either from the front or from the back. Once two shaped sections have been removed toward one side, all shaped sections located in-between can also be freely removed. In the same way, with a corresponding sequence of the shaped sections, the assembly can also be performed from any random side.

The strip projections 41A, 43A on the side of the side walls 20, 21 from which the shaped section 11 is to be inserted are graduated wider by the tongue and groove width W, M, than the strip projections 40A, 42A on the opposite front 26.

The strip projections 41A, 43A that are located further out preferably extend hook-like from the free wall 27. The more closely spaced strip projections 40A, 42A; 53, 55 extend as free ends of the side walls 20, 21, or hook-shaped parallel thereto. The ends of the more closely spaced strip projections are recessed in each case from the front or back wall 26, 27 by one material thickness M, so that when the strip projections 50, 53 are pushed into the bottom of the grooves, the front and back 26, 27 of the shaped sections 10, 12, are flush in each case.

The side walls 20, 21, incorporate centrically undercut grooves 31, 33, which may optionally receive wall plates, door connections, etc.

On the front 26, additional undercut grooves 30, 32, 34 are formed in both end regions. They serve to either receive connecting elements or, as shown, finishing plates 60, which are held frictionally or locked in place with spring elements 61, 62 on the groove edges. The plate front is provided with a profiling 63.

The given adjacent grooves 32, 34 on the front have a center distance A of approximately half the wall thickness WD, which is 80 mm, for example.

The shown corner shaped section 15 incorporates on the side walls 25 the corresponding tongue-and-groove arrangement 44, 44A, 45, 45A, into which the strip projections 54, 55 of the adjoining flat shaped section 12 engage.

Figure 2:
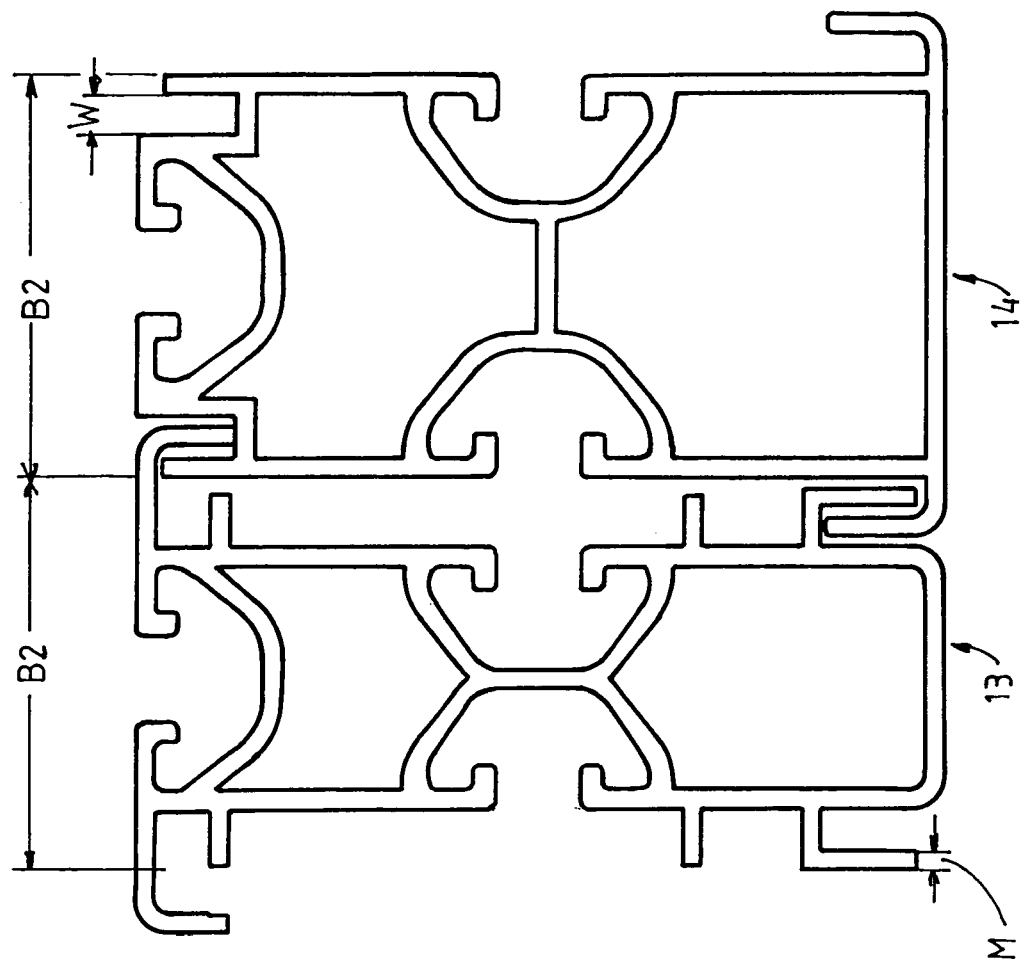
FIG. 2 shows a wall segment of short elements.

The many varied requirements for cabin construction are met with shaped sections 10-14 of different widths B1, B2. In addition to the 200 mm wide shaped sections 10-12 shown in FIG. 1, shaped sections 13, 14, of 40 mm width B2 are shown in FIG. 2 in an enlarged scale. Since the width across the corner E of the corner piece 15, FIG. 1, is also 40 mm, the cabins can be assembled in a 40 mm modular dimension on the inside and outside.

As a result of the above structure shown in FIGS. 1-2, tongues and grooves are formed on two side walls thereof and the grooves on a front of the side walls of each of the sections opening in the same direction as the grooves on a back of the side walls of said each of the sections; the direction of the opening is perpendicular to the height of the wall, and the structure is such that the tongues and grooves of adjoining sections are capable of being joined together in a direction that is perpendicular to the height of the wall.

The surfaces of the shaped sections and wall elements are advantageously provided with an anodized or chromate coating in a known manner, whereby penetration of the laser beams through the various wall layers is impeded.

LIST OF REFERENCE NUMERALS

1 Protective Wall
2 Interior Walls
10, 11, 12, 13, 14 Shaped Sections
15 Corner Shaped Section
20, 21, 22, 23, 24, 25 Side Walls
26 Front Wall
27 Back Wall
30, 31, 32, 33, 34, 35 Grooves
40, 41, 42, 43, 44, 45 Grooves
40A, 41A, 42A, 43A Strip Projections
50, 51, 52, 53, 54, 55 Strip Projections
60 Finishing Plates
61, 62 Spring Elements
63 Shaped Ring Section
A Groove Center Distance
B1, B2 Widths of Shaped Sections
E Width across Corners
M Material Thickness, Strip Width
W Groove Width
WD Wall Thickness

What is claimed is:

1. A protective wall (1) for shielding against laser beams, optionally including laser beams stemming from welding machines,
wherein the protective wall (1) contains light-alloy shaped sections (10-14) which are essentially rectangular, and incorporates chambers formed by interior walls (2), and tongues and grooves formed on two side walls thereof, the grooves on a front of the side walls of each of the sections opening in the same direction as the grooves on a back of the side walls of said each of the sections, the direction of the opening being perpendicular to the height of the wall, and the structure is such that the tongues and grooves of adjoining sections are joined together in a direction that is perpendicular to the height of the wall,
wherein the light-alloy shaped sections (10-14) are lined up and connected side wall to side wall in an individually removable manner to form the protective wall (20, 22; 21, 23; 24, 25) in such a way that the tongues and grooves on the two side wall are implemented step-like from a front wall (26) to a back wall (27).

2. A protective wall according to claim 1, wherein the tongues and grooves on the side walls (20-25) is implemented in each case in the form of side-wall grooves (40-43) into which the strip projections (50-53) of the adjoining side wall (22, 23) engage in each case, and that the strip projections (40A, 41A; 42A, 43A) with a respective associated groove are implemented laterally offset relative to one another on each side wall (20, 21) in a step-like manner from the front wall (26) to the back wall (27) so that on the individual shaped sections (10-14) front strip projections (40A, 42) are located alternately closer to one another than those on the back, and vice versa.

3. A protective wall according to claim 2, wherein the hook-shaped strip projections (41A, 43A) that are spaced further apart extend flush into the front or back wall (26, 27) and are hook shaped, and the given more closely spaced strip projections (40A, 42A) are extensions of the side wall (20, 21) or formed integral with the side wall (22, 23) as hook-shaped strip projections (51, 53).

4. A protective wall according to claim 3, wherein the given more closely spaced strip projections (40A, 42A; 51, 53) end recessed relative to the front or back wall (26, 27) by one material thickness (M), so that a flush front and back wall is created in each case.

5. A protective wall according to claim 1, wherein the shaped sections (10-14) have different widths (B1, B2), each of which are whole-number multiples of one base width (B2).

6. A protective wall according to claim 5, wherein having a wall thickness (WD) that corresponds to two base widths (B2).

7. A protective wall according to claim 1, wherein a light-alloy shaped section (15) is a corner shaped section, incorporating in each case a rectangular front and back wall, and its side walls (25) are positioned at a right angle to one another.

8. A protective wall according to claim 2, wherein undercut grooves (31, 33, 35) are disposed centrically on the side walls (20, 21, 23) in each case, and their width is suitable for a multi-layered laser protective wall plate.

9. A protective wall according to claim 2, wherein undercut grooves (30, 32) on the front extend closely adjacent in each case to the grooves (40, 42) that receive the strip projections (50, 52).

10. A protective wall according to claim 9, wherein the undercut grooves (32, 34) on the front of adjoining shaped sections (11, 12; 13, 14) have a center distance (A) that corresponds to a base width (B2).

11. A protective wall according to claim 9, wherein the undercut grooves (30, 32, 34) on the front are suitable in their width in each case to receive a multi-layered laser protective wall plate.

12. A protective wall according to claim 7, wherein rear grooves (30-34) on the front are implemented on the corner shaped section (15), and its angled front wall areas each have a width across the corner (E) that corresponds to a base width (B2).

13. A protective wall according to claim 5, wherein the base width is about 30-50 mm.

14. A protective wall according to claim 12, wherein, in the rear grooves (30-34) on the front, finishing plates (60) are held by means of spring elements (61, 62) formed integrally thereon.

15. A protective wall according to claim 14, wherein the finishing plates (60) have a profiling (63) on the front.

16. A protective wall according to claim 14, wherein the finishing plates (60) extend from on of the shaped sections (11) to the adjoining shaped section (12).

17. A protective wall according to claim 15, wherein the shaped sections (10-15) and/or the finishing plates (60) are extruded from light-alloy and provided with an anodized or chromate coating.

18. A protective wall according to claim 13, wherein the base width is about 40 mm.

19. A protective wall (1) for shielding against laser beams, said protective wall comprising light-alloy shaped sections (10-14) which are essentially rectangular, and chambers formed by interior walls (2), and tongues and grooves formed on two side walls thereof,
wherein the light-alloy shaped sections (10-14) are lined up and connected side wall to side wall in an individually removable manner to form the protective wall (20, 22; 21, 23; 24, 25) in such a way that the tongues and grooves on each side of the wall is implemented step-like from a front wall (26) to a back wall (27), wherein the tongues and grooves on the side walls (20-25) comprises parallel side-wall grooves (40-43) into which the strip projections (50-53) of the adjoining side wall (22, 23) are configured to engage, wherein the strip projections (40A, 41A; 42A, 43A) with a respective associated groove are implemented laterally offset relative to one another on each side wall (20, 21) in a step-like configuration from the front wall (26) to the back wall (27) so that on the individual shaped sections (10-14) one set of the strip projections are located alternately closer to one another than the other set of strip projections, and wherein the grooves on a front of the side walls of each of the sections open in the same direction as the grooves on a back of the side walls of said each of the sections, the direction of the opening being perpendicular to the height of the wall, and the structure is such that the tongues and grooves of adjoining sections are joined together in a direction that is perpendicular to the height of the wall.

20. A protective wall according to claim 19, wherein the hook-shaped strip projections (41A, 43A) that are spaced further apart extend flush into the front or back wall (26, 27) and are hook shaped, and the given more closely spaced strip projections (40A, 42A) are extensions of the side wall (20, 21) or formed integral with the side wall (22, 23) as hook-shaped strip projections (51, 53).

21. Sections for forming a protective wall, each section comprising a first wall and a second wall, and side walls connecting said first and second walls to form substantially rectangular sections, a first group of said sections further comprising a plurality of parallel side-wall grooves, wherein a first subset of said plurality of grooves are disposed adjacent to said first wall so as to be open in the direction facing the first wall, and a second subset of said plurality of grooves are disposed adjacent to said second wall so as to be open in the direction facing the second wall, and wherein said first subset of said plurality of grooves are located within the side walls forming said sections in said first group of sections, and said second subset of said grooves are located outside the side walls forming said sections in said first group of sections; and a second group of said sections further comprising a plurality of hook-shaped projections extending outwardly from the side walls forming said sections in said second group of sections, said hook-shaped projections having a first arm extending outwardly and perpendicularly with respect to the side walls, and a second arm extending from an end of said first arm and parallel to the side walls, the first arm of a first subset of said hook-shaped projections being longer than the first arm of a second subset of said hook-shaped projections, wherein the first subset of said grooves of each of the sections open in the same direction as the second subset of said grooves of said each of the sections, the direction of the opening being perpendicular to the height of the wall, and the structure is such that the projections and grooves of adjoining sections are joined together in a direction that is perpendicular to the height of the wall.

22. A protective wall comprising a plurality of sections of claim 21, wherein alternate ones of said sections are connected to one another in alternate directions perpendicular to the height of the walls by insertion of said plurality of hook-shaped projections into corresponding ones of said plurality of grooves.

* * * * *